United States Patent
Keune et al.

(10) Patent No.: US 12,500,465 B2
(45) Date of Patent: Dec. 16, 2025

(54) TUBE WITH SLOT CLOSURE WEDGES FOR SEALING THE WINDING REGIONS IN ELECTRIC MACHINES WITH A DIRECT SLOT COOLING FUNCTION

(71) Applicant: Schaeffler Technologies AG & Co. KG, Herzogenaurach (DE)

(72) Inventors: Alexander Keune, Kappelrodeck (DE); Thomas Hurle, Buhlertal (DE); Jonas Kniel, Karlsruhe (DE); Patrick Gramann, Renchen (DE); Michael Heilmann, Karlsruhe (DE); Niels Wehlau, Munich (DE); Johann Sontheim, Andechs (DE); Michael Menhart, Igling (DE); Johann Oswald, Eschenlohe (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 267 days.

(21) Appl. No.: 18/031,462

(22) PCT Filed: Oct. 4, 2021

(86) PCT No.: PCT/DE2021/100797
§ 371 (c)(1),
(2) Date: Apr. 12, 2023

(87) PCT Pub. No.: WO2022/078548
PCT Pub. Date: Apr. 21, 2022

(65) Prior Publication Data
US 2023/0378836 A1   Nov. 23, 2023

(30) Foreign Application Priority Data
Oct. 13, 2020  (DE) .......................... 102020126813.0

(51) Int. Cl.
*H02K 3/24*     (2006.01)
*H02K 3/487*    (2006.01)

(52) U.S. Cl.
CPC ............... *H02K 3/24* (2013.01); *H02K 3/487* (2013.01)

(58) Field of Classification Search
CPC .. H02K 1/16; H02K 1/26; H02K 3/24; H02K 3/487; H02K 3/50; H02K 5/128; Y02E 50/30; Y02W 30/40
See application file for complete search history.

(56) References Cited

U.S. PATENT DOCUMENTS

| 4,227,108 A * | 10/1980 | Washizu ................ H02K 5/128 310/58 |
| 2009/0289520 A1* | 11/2009 | Takeshita ............... H02K 3/487 310/214 |

FOREIGN PATENT DOCUMENTS

| DE | 102005044832 A1 | 3/2007 |
| DE | 102014207468 A1 | 10/2015 |

(Continued)

*Primary Examiner* — Naishadh N Desai
(74) *Attorney, Agent, or Firm* — Volpe Koenig

(57) ABSTRACT

An electromagnetic element for an electric machine, having multiple slots arranged in the circumferential direction of the electromagnetic element, said slots extending in the axial direction of the electromagnetic element and having an open side in the radial direction. A coil device is arranged in the slots, said coil device having winding heads on (at least) one axial end face of the electromagnetic element, and a cooling channel is formed in the slots in order to dispense heat from the coil device using a fluid. A wall element is also provided which has a first region that is arranged in the region of the winding head in the circumferential direction. and a second region of the wall element, said second region adjoining the first region and having teeth which extend in the axial direction and are arranged on the open side of the slots in the (Continued)

intermediate spaces between the slots in the circumferential direction.

13 Claims, 3 Drawing Sheets

(56) References Cited

FOREIGN PATENT DOCUMENTS

| | | | | |
|---|---|---|---|---|
| DE | 102015013018 A1 | 4/2017 | | |
| DE | 102016101705 A1 | 8/2017 | | |
| DE | 102017218933 A1 | 4/2019 | | |
| EP | 1271747 A1 | 1/2003 | | |
| EP | 3157138 A1 | 4/2017 | | |
| FR | 2840122 A1 * | 11/2003 | ............... | H02K 3/24 |
| GB | 2509738 A | 7/2014 | | |
| JP | 200448877 A | 2/2004 | | |
| JP | 200448878 A | 2/2004 | | |
| JP | 2016149900 A2 | 8/2016 | | |
| WO | 2010058278 A2 | 5/2010 | | |

* cited by examiner

1a)

1b)

TUBE WITH SLOT CLOSURE WEDGES FOR SEALING THE WINDING REGIONS IN ELECTRIC MACHINES WITH A DIRECT SLOT COOLING FUNCTION

CROSS-REFERENCE TO RELATED APPLICATIONS

This application is the U.S. National Phase of PCT Appln. No. PCT/DE2021/100797, filed Oct. 4, 2021, which claims the benefit of German Patent Appln. No. 102020126813.0, filed Oct. 13, 2020, the entire disclosures of which are incorporated by reference herein.

TECHNICAL FIELD

The disclosure relates to an electromagnetic element for an electric machine with a device for dissipating heat and an electric machine with such an element.

BACKGROUND

In electric machines, there is power loss during active operation and thus heat input. Active cooling is required when cooling via free convection, i.e. thermal conduction to neighboring components or thermal radiation into the environment, is no longer sufficient.

Such cooling can be effected by a moving fluid which, in the case of an internal rotor, is guided, for example, through a cooling jacket lying around the stator. New cooling methods deal with direct cooling in the stator to cool the iron and the wires.

In general, jacket cooling and winding head cooling are included in the prior art for cooling electric machines. While jacket cooling transfers the heat generated on the surface of the stator laminations into a cooling circuit, with winding head cooling, the heat transfer into the fluid takes place directly on the conductors outside the stator laminations in the region of the winding heads.

With direct cooling, it is possible to dissipate the heat specifically at the point of origin. As a result, the general temperature level in electric machines (both traction machines and generator machines) can be lowered and a more homogeneous temperature distribution can be ensured.

So-called canned machines are known in the prior art. In these, a tube is introduced into the air gap between the rotor and the stator in order to create a fluidically sealed cooling space, so that direct cooling can take place using a cooling fluid. The disadvantage here is that the air gap is larger compared to a design without such a tube, which has a negative effect on the performance of the machine.

Further cooling improvements are provided by separate cooling channels, which are introduced both into the laminated core of the stator (e.g. EP3157138 A1) and into the slot in addition to the conductors.

The following patent applications are already known as prior art for improved cooling with direct contact between fluid and conductor in the slot:

DE102015013018 A1 describes a stator for an electric machine with a plurality of stator teeth projecting radially from a basic annular shape, the stator having a stator housing which, together with the stator body, encloses a cooling volume through which coolant can flow.

JP2016149900 A2 describes a cooling system for an electric motor, with a cooling area being separated in the housing by separating the rotor and stator.

An electromagnetic element according to the preamble of claim 1 is known from DE102016101705 A1.

SUMMARY

It is accordingly the object of the present disclosure to provide an electromagnetic element for an electric machine with a device for dissipating heat and an electric machine with the electromagnetic element, in which cooling that is implemented in this way does not cause any adverse effects on the performance of the electromagnetic element using the electric machine.

The object is achieved by an electromagnetic element for an electric machine having the features of claim 1 and an electric machine having the features of claim 10.

According to one aspect of the disclosure, an electromagnetic element of an electric machine has a plurality of slots arranged in the circumferential direction of the electromagnetic element, which extend in an axial direction of the electromagnetic element and have an open side in the radial direction. A coil device is arranged in the slots and comprises at least one winding head on an axial end face of the electromagnetic element. A cooling channel for dissipating heat from the coil devices is formed in the slots using a fluid. A wall element with a first section in the circumferential direction is arranged in the region of the winding head. A second region adjoins the first region of the wall element. The second region has teeth extending axially and disposed on the open side of the slots in intermediate spaces between the slots in the circumferential direction.

Further advantageous embodiments of the disclosure are set forth herein.

The wall element is preferably fixed to the electromagnetic element at the end face. This offers the advantage that the wall element can be fixed in place in the axial direction via the teeth in the slots. The wall element is designed in such a way that it has a sealing surface for the electromagnetic element in the axial direction.

According to a further embodiment, the open sides of the slots are closed by two wall elements which lie on opposite end faces of the electromagnetic element. An advantage of this configuration is that because of the teeth over the axial length, only one gap and not two gaps per space remain in the slots. Furthermore, the assembly process is thus shortened. In particular, the two wall elements are designed as identical parts, which further reduces the manufacturing effort.

According to a further embodiment, the wall element consists of several components. In particular, the wall element consists of a tubular element that is closed in the circumferential direction, a further tubular element containing the teeth, and a slot sealing wedge. This results in the advantage that a cross-sectional contour of the first region can be selected in accordance with the desired housing connection. From a manufacturing perspective, this also offers the advantage of a modular design due to the use of identical parts.

It is also advantageous if the wall element has a sealing surface in the first region. In particular, this involves a radial sealing surface for sealing towards a further element of the dynamoelectric machine by means of an annular seal.

In an advantageous embodiment, the electromagnetic element is a rotor or a stator of an electric machine.

According to a further aspect, an electric machine includes an electromagnetic element, wherein the electromagnetic element is designed according to the previous aspect and the previous configurations. The electromagnetic machine offers the advantage that the design of the electromagnetic element means that the cooling medium does not get into the air gap or onto rotating components, which can have a negative impact on the performance of the machine, such as drag torques in particular.

The disclosure will now be explained in more detail below with reference to various figures, in which context various exemplary embodiments are also shown.

BRIEF DESCRIPTION OF THE DRAWINGS

In the figures.

DETAILED DESCRIPTION

The figures are only schematic in nature and serve only for understanding the disclosure. The same elements are provided with the same reference symbols. Furthermore, the features of the different exemplary embodiments can in principle be freely combined with one another.

Figure 1:
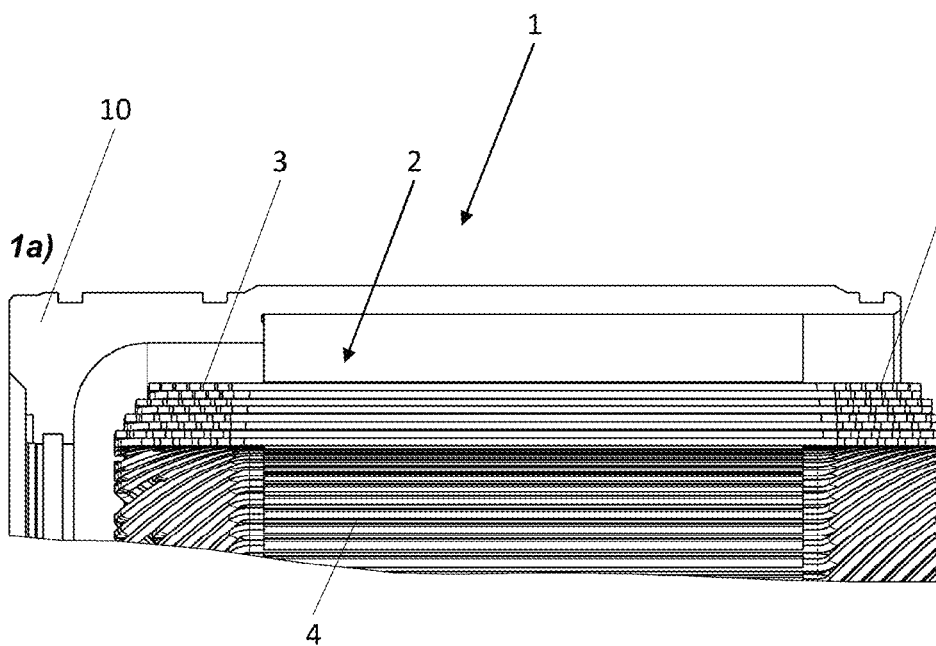
FIG. 1 shows a section through an electromagnetic element
Figure 1:
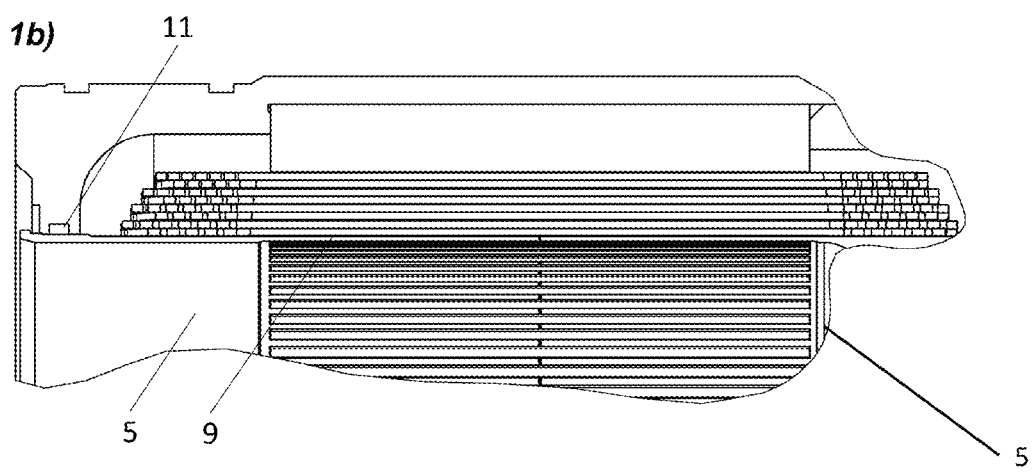

FIG. 1a shows a section through an electromagnetic element 1 in the illustrated embodiment of a stator of an electric radial flux machine. FIG. 1a shows a coil device 2 of the stator, which is designed here as a distributed wave winding. The coil device 2 has a winding head 3 at each of its axial ends relative to the stator. On the radial inner side, the stator has slots 4 extending axially, in which the coil device runs at least in sections. The slots 4 are open both at the front in the axial direction and in the radial direction.

FIG. 1b shows the previously described electromagnetic element 1, with a wall element 5 being introduced into the slots 4 of the stator and thus a fluidically tight cooling channel 9 being formed in the slots 4 in sections. A sealing surface 11 is provided for sealing against a housing element 10 of the electric machine. An annular seal, not shown, is installed between the sealing surface 11 and the housing element 10.

Figure 2:
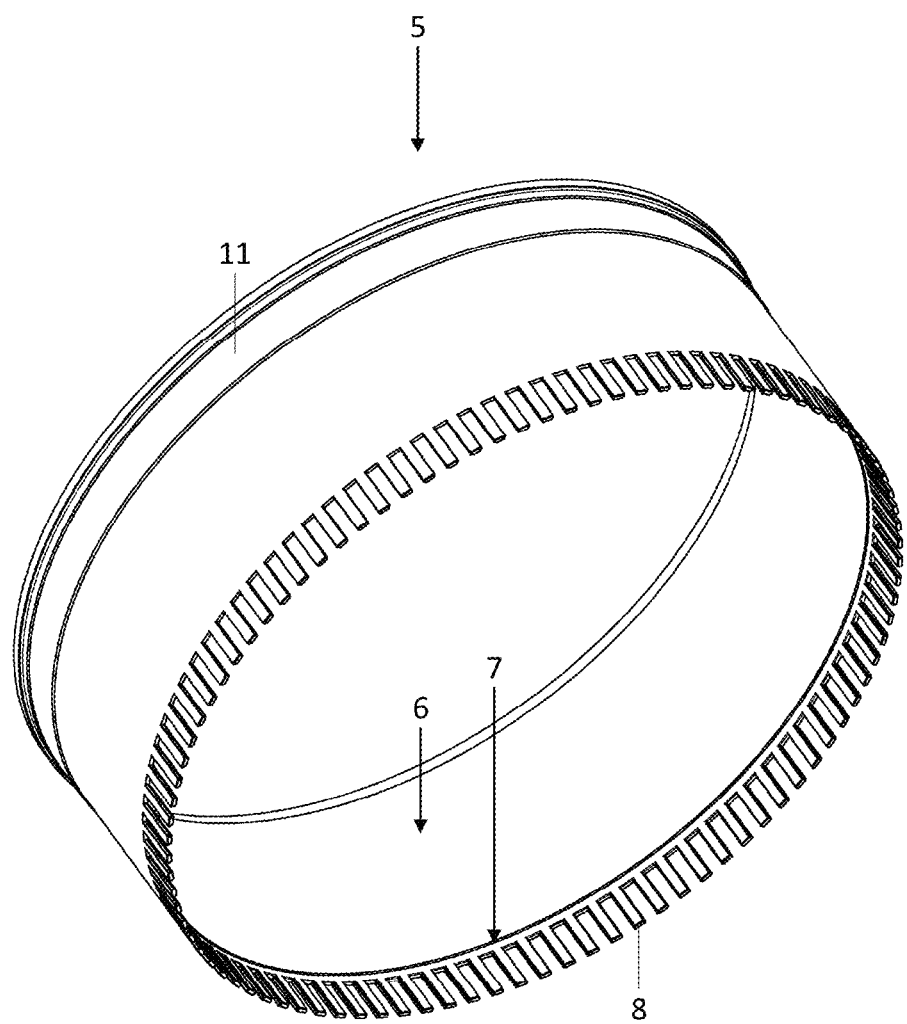
FIG. 2 shows a perspective view of a wall element

For a more detailed illustration, FIG. 2 shows a perspective view of a wall element 5. The wall element 5 has a first section 6 which is essentially designed as a tube section and is arranged in the installed state in the region of the winding head 3 as shown in FIG. 1b. A sealing surface 11 is provided in the first region 6 for sealing with respect to the housing element 10 of the electric machine, as described above.

A second region 7 directly adjoining the first region 6 has teeth 8 corresponding to the slots 4 of a stator. The teeth 8 extend in the axial direction with respect to the stator. The wall element 5 is pushed into the slots 4 on the end face of the electromagnetic element 1.

As shown in the embodiment in FIG. 1b, the teeth 8 in connection with the slots 4 form a cooling channel 9 in sections and seal this inwardly in sections in the radial direction. The second region 7 seals the electromagnetic element 1 in the radial direction inwardly in the region of the winding head 3. In the embodiment shown, a wall element 5 is introduced on opposite end faces of the electromagnetic element 1 in such a way that the corresponding teeth 8 of the two wall elements 5 of each slot 4 form a fluidically closed cooling channel 9.

Figure 3:
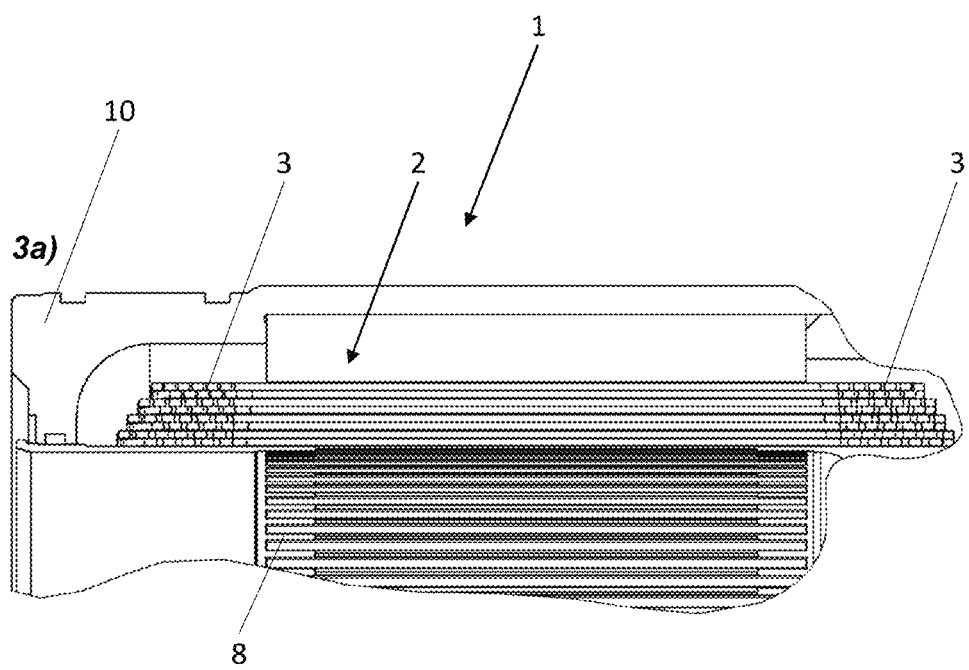
FIG. 3 shows a variant of the embodiment described
Figure 3:
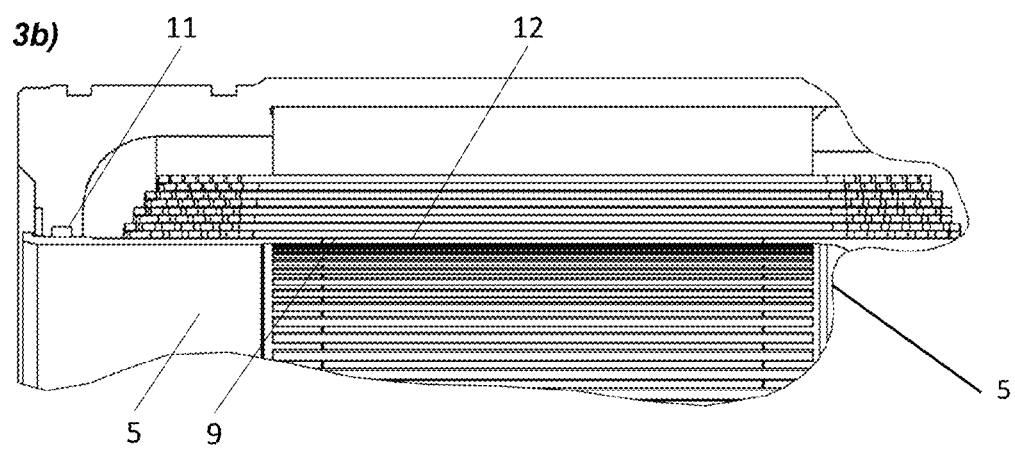

FIG. 3a shows a variant of the embodiment described above, in which the wall elements 5 have shortened teeth 8. The cooling channel 9 is therefore only partially formed by the teeth 8 in the slots 4. The area of the slots that remains free is closed by additional slot sealing wedges, as shown in FIG. 3b.

LIST OF REFERENCE SYMBOLS

1 Electromagnetic element
2 Coil device
3 Winding head
4 Slot
5 Wall element
6 First region
7 Second region
8 Teeth
9 Cooling channel
10 Housing element
11 Sealing surface
12 Slot sealing wedge

The invention claimed is:

1. An electromagnetic element for an electric machine, comprising:
multiple slots arranged in a circumferential direction of the electromagnetic element, said slots extending in an axial direction of the electromagnetic element and having an open side in a radial direction; a coil device arranged in the slots and having winding heads on at least one axial end face of the electromagnetic element;
a cooling channel formed in the slots in order to dissipate heat from the coil device using a fluid; and
a wall element which has a first region that is arranged by the winding head in the circumferential direction, wherein a second region of the wall element adjoins the first region and has teeth which extend in the axial direction, and the teeth are arranged on an open side of the slots in intermediate spaces between the slots in the circumferential direction;
wherein the wall element has a sealing surface to the electromagnetic element in the axial direction in the first region configured to seal against a further element of the electric machine at a location radially inward of a radial outer extent of the electromagnetic element;
wherein the sealing surface includes a radial sealing surface for sealing towards a further element of the electric machine with an annular seal;
wherein the sealing surface has a radially extending multi-stage structure;
wherein the wall element comprises a circumferentially closed tubular element, a further tubular element containing the teeth, and a slot sealing wedge, and
wherein the teeth are formed with a shortened length that covers only a portion of the grooves to partially form the cooling channel, and the remaining portion of the grooves is closed by slot sealing wedges.

2. The electromagnetic element for an electric machine according to claim 1, wherein the wall element is fixed to the end face of the electromagnetic element.

3. The electromagnetic element an electric machine according to claim 1, wherein the open side of the slots is closed by two wall elements which are fixed to opposite end faces of the electromagnetic element.

4. The electromagnetic element an electric machine according to claim 1, wherein the wall element includes multiple components.

5. The electromagnetic element for an electric machine according to claim 4, wherein the wall element includes a circumferentially closed tubular element, a further tubular element containing the teeth a slot sealing wedge.

6. The electromagnetic element according to claim 1, wherein the electromagnetic element comprises at least one of a rotor or a stator.

7. An electric machine comprising:
a housing; and
an electromagnetic element supported in the housing, wherein the electromagnetic element comprises:
multiple slots arranged in a circumferential direction of the electromagnetic element, said slots extending in an axial direction of the electromagnetic element and having an open side in a radial direction;
a coil device arranged in the slots and having winding heads on at least one axial end face of the electromagnetic element:
a cooling channel formed in the slots in order to dissipate heat from the coil device using a fluid; and
a wall element which has a first region that is arranged by the winding heads in the circumferential direction, wherein a second region of the wall element adjoins the first region and has teeth which extend in the axial direction, and the teeth are arranged on an open side of the slots in intermediate spaces between the slots in the circumferential direction;
wherein the wall element has a sealing surface to the electromagnetic element in the axial direction in the first region configured to seal against a circumferential inner surface of the housing;
wherein the sealing surface includes a radial sealing surface for sealing towards a further element of the electric machine with an annular seal;
wherein the sealing surface has a radially extending multi-stage structure;
wherein the wall element comprises a circumferentially closed tubular element, a further tubular element containing the teeth, and a slot sealing wedge, and
wherein the teeth are formed with a shortened length that covers only a portion of the grooves to partially form the cooling channel, and the remaining portion of the grooves is closed by slot sealing wedges.

8. The electric machine according to claim 7, wherein the wall element is fixed to the end face of the electromagnetic element.

9. The electric machine according to claim 7, wherein the open side of the slots is closed by two wall elements which are fixed to opposite end faces of the electromagnetic element.

10. The electric machine according to claim 7, wherein the wall element includes multiple components.

11. The electric machine according to claim 7, wherein the sealing surface is radially inward of a radially outer extend of the electromagnetic element.

12. The electric machine according to claim 11, wherein the sealing surface includes a radial sealing surface for sealing towards a further element of the electric machine with an annular seal.

13. The electric machine according to claim 7, wherein the electromagnetic element comprises at least one of a rotor or a stator.

* * * * *